Sept. 12, 1967 L. J. KABELL 3,341,857
SEMICONDUCTOR LIGHT SOURCE
Filed Oct. 26, 1964 3 Sheets-Sheet 1

LOUIS J. KABELL
INVENTOR.
BY Roger S. Borovoy
ATTORNEY

LOUIS J. KABELL
INVENTOR.
BY Roger A Borovoy
ATTORNEY

LOUIS J. KABELL
INVENTOR
BY [signature]
ATTORNEY

United States Patent Office 3,341,857
Patented Sept. 12, 1967

3,341,857

SEMICONDUCTOR LIGHT SOURCE

Louis J. Kabell, Palo Alto, Calif., assignor to Fairchild Camera and Instrument Corporation, Syosset, N.Y., a corporation of Delaware Filed Oct. 26, 1964, Ser. No. 406,492
17 Claims. (Cl. 346—107)

This invention relates to a semiconductor device and more particularly to a semiconductor light source preferably formed from a matrix arrangement of PN junctions.

It is well known in the prior art that information, and specifically digital data, may be recorded on a recording medium, such as photographic materials, by means of a cathode ray tube or electron beam gun. In such systems, the beam is deflected to the data recording position and the film is exposed by gating the beam on in this position. In these systems, the electron beam and recording media may be within a vacuum chamber or the electron beam may be part of a cathode ray tube which has its face optically coupled to the recording media. Other positioning methods than beam deflection have also been used for relatively positioning the recording transducer and the recording media, such as the system shown in U.S. Patent 3,084,334.

While the electron beam systems are operable and acceptable for some applications, they have the shortcoming of not being able to accurately and repeatedly locate the same data position. Further, the recorded dots do not have uniform density distribution from dot to dot and within a single dot which tends to reduce reading reliability. Finally, complex optical systems are required to image the cathode ray tube face on the photographic media or alternatively, complex vacuum chambers, transports, and controls are required in order to place the media in the same vacuum chamber as the electron beam gun.

This invention overcomes the disadvantages of beam positioning systems by providing a matrix of minute stationary light sources that may be selectively energized to record a spot at a given data position. Positioning problems are eliminated because, once the light source is fabricated, the data positions remain fixed and any data position may be accurately and repeatedly located. Until this invention, such a solution was not practical as light sources could not be fabricated in a size small enough to obtain practical recording densities without the use of complex optical systems. Even with complex optical systems, the recording speeds of light spot devices were insufficient. For example, light sources such as an array of gas discharge cells, could not readily be formed into light emitting regions having small enough dimensions, (e.g., about 2 mils); and the speed of operation of such a gas discharge cell is relatively slow. A typical gas discharge device light source is shown in U.S. Patent 2,933,648, issued to A. D. Bentley on Apr. 9, 1960. Similar limitations apply to incandescent sources.

This invention provides a suitably minute light source by using an integrated circuit matrix of minute PN junctions that may be selectively energized to emit light. Previously, researchers have recognized the presence of light emission from microplasmas located in PN junctions operated in the avalanche mode. See, for example, Chynoweth and McKay, Photon Emission From Avalanche Breakdown in Silicon, Physical Review, 102, 369 (1956). This emission has been regarded as an interesting phenomenon but little practical use has been made of it. This may be attributed to the general impression that sufficient light is emitted to be useful. To the contrary, this invention uses a silicon wafer which emits a useful amount of light. Significant improvements over the prior art practices are obtained by eliminating all optics between the light source and the recording media and placing the light source very close to this media to obtain in essence a near contact recording. In addition, the PN junctions are doped with a high concentration of dopant near the surface of the wafer to maximize the efficiency of the light generating processes. This high concentration of dopants near the surface results in the avalanche breakdown occurring only near the surface of the wafer; consequently, a minimum of light is absorbed by the semiconductor wafer. Thus the short wavelengths which are generally most effective in exposing photographic recording media are not substantially attenuated by the wafer. Confining the avalanche breakdown to the surface also minimizes the dissipation of energy incident to the creation of ineffective microplasmas beneath the surface. The light emitted by the PN junction results in dots having uniform densities from dot to dot and within each dot.

As stated above, the device may utilize a silicon wafer. This enables all the advantages incident to planar technology to be employed in the manufacture of a light source. It can be mass produced with a high degree of automation and reliability. The geometry available is virtually unlimited.

Along with the above-stated advantages of manufacturability, positional accuracy and repeatability, elimination of optical or vacuum complexity, formation of an efficient minutes light source, and the generation of uniform density dots, the light source has a turn-off and turn-on time less than five nanoseconds, which implies relatively high rate of operation. Of course, the device also has those advantages that are common to solid state devices, such as long life, and no mechanical moving parts.

Briefly, the invention, according to one aspect thereof, comprises an integrated circuit having a plurality of electrically isolated "planar" type PN junctions, i.e., all of the junctions extend to a single substantially planar surface of a body of semiconductor material, which are arranged in an orderly matrix, such as an $x$–$y$ matrix. The junctions are interconnected for $x$–$y$ accessing by means of a first series of conductors which connects the regions of a first conductivity type in all of the diodes in rows, and another series of conductors for connecting the opposite conductivity type regions of all of the junctions in columns. The conductors are arranged so that they are electrically insulated from each other and from the surface of the semiconductor body except where the conductors contact the respective desired regions.

Preferably, according to another aspect of the invention, electrical insulation of the conductors is achieved by forming one series of conductors as continuous conductive strips which are separated from the surface of the semiconductor body by a layer of insulating material and forming the other series of conductors by a series of short conductive strips, also separated from the semiconductor surface by the insulating layer, and conductive semiconductor portions located in the semiconductor body beneath the continuous conductive strips.

According to another aspect of the invention, at least one of the semiconductor regions bounding the PN junctions in the matrix has a dopant concentration which is highest in the proximity of the surface so that when an energizing means, which is of sufficient magnitude to create an avalanche mode of operation in the selected junction, is connected to selected row and column conductors, avalanche breakdown will take place near the surface and a minimum of the short wavelength light will be absorbed by the semiconductor regions.

Still another aspect of the invention comprises a semiconductor light source comprising a first region of semiconductor material of one conductivity type with a substantially planar surface having a second region of opposite conductivity type located therein adjacent said surface so that the PN junction formed between the two regions extends to the surface. One of the regions has a concentration of dopant that is highest near the surface, for example, within one micron of the surface, so that a maximum amount of light is emitted when the junction is operated in the avalanche mode. Preferably, the dopant concentration enables avalanche breakdown to take place within 0.5 micron from the surface while avalanche breakdown at distances greater than 0.5 micron is minimized. The two regions forming the junction are, according to another feature of the invention, formed within a semiconductor body of conductivity type opposite to that of said first region so that the first and second regions extend to a single surface of the semiconductor body.

The invention may be understood from the following description and the accompanying drawings. To facilitate an understanding of the invention, a specific example is illustrated and described, along with a few alternate embodiments. It should be understood that this invention is not limited to the particular features and details set forth with reference to the figures, wherein.

Figure 4:
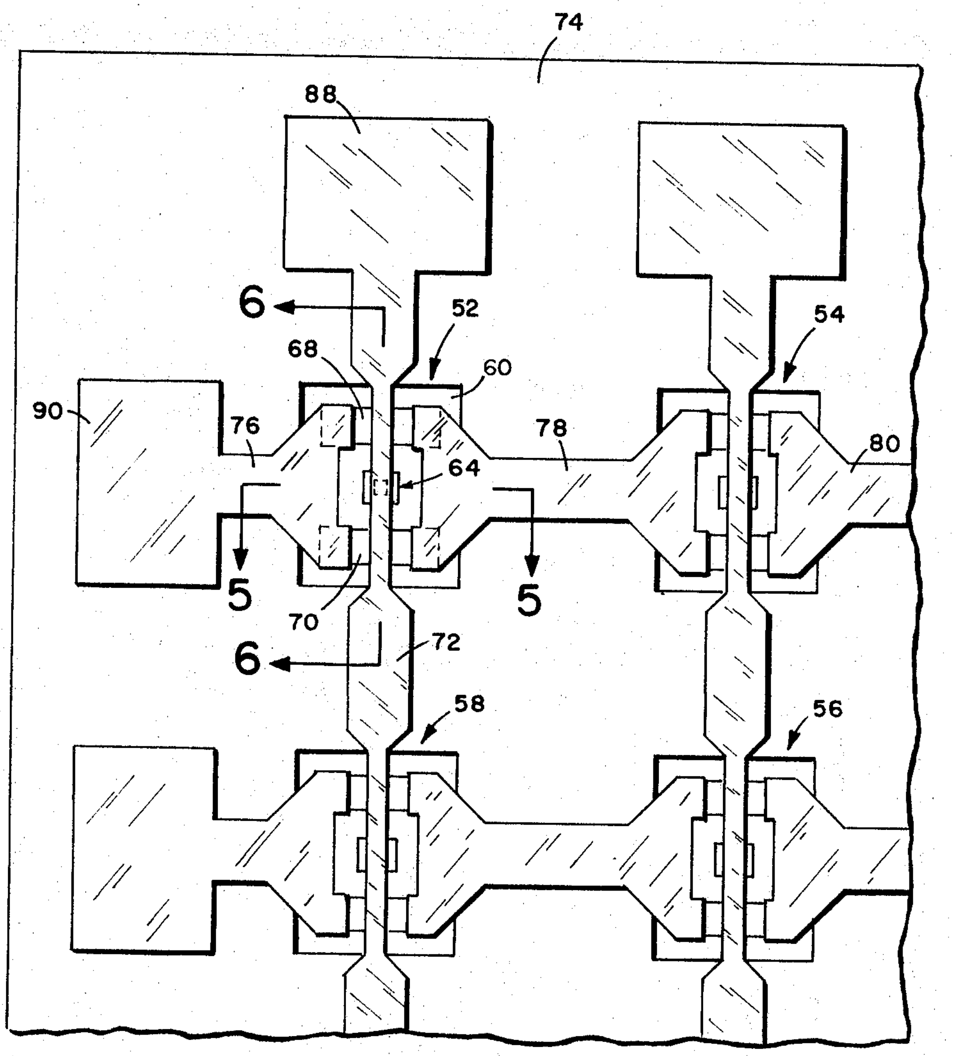
FIG. 4 is a greatly enlarged plan view of part of an *x–y* matrix.
Figure 5:
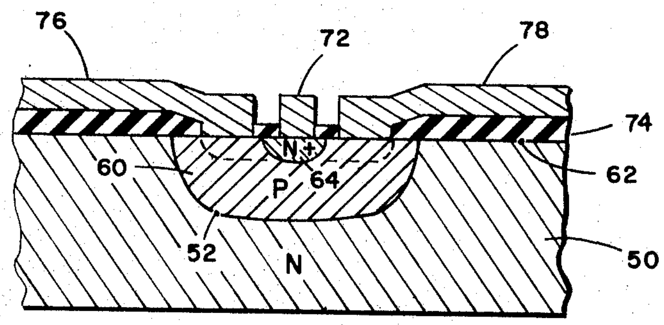
Figure 6:
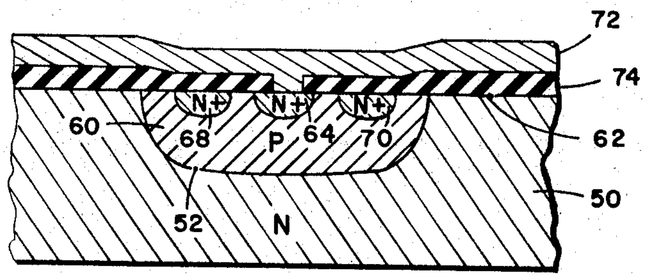

FIGS. 5 and 6 are sectional views of the *x–y* matrix taken along the lines 5—5 and 6—6, respectively of FIG. 4.

Figure 1:
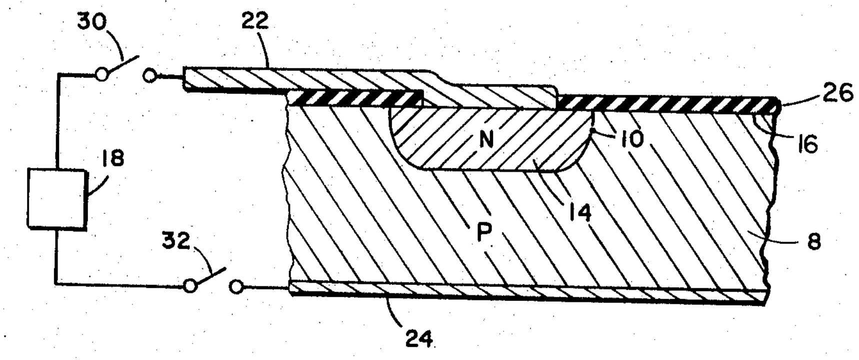
FIG. 1 is a schematic drawing of a PN junction that is operated in accordance with this invention.

Referring to FIG. 1, a single PN junction 10 is shown. This junction 10 separates a body of first conductivity type 8 and a region of second opposite conductivity type 14 formed by well known thermal diffusion techniques. The body 8 is typically a P-type semiconductor, such as silicon doped with boron, aluminum, indium, or gallium, while the region 14 is N-type, containing dopants such as phosphorus, arsenic, or antimony. It has been found that, for light emitting purposes, phosphorus for the N-type region and boron for the P-type body 8 may be advantageously employed. At about 0.1 to 0.3 micron from the surface 16, the concentration of boron has its highest value of about $7 \times 10^{18}$ atoms per cc., while the phosphorus is present in this region in amounts ranging from about $10^{20}$ to $10^{21}$ atoms per cc. This concentration in the body 8 sharply decreases at greater distances away from the point on the surface to which the junction extends inwardly into the wafer. It is the lower concentration in underlying portions of body 8 that determines the voltage at which avalanche breakdown takes place. A graphical showing of this concentration profile appears in FIG. 2 which is considered later in the specification.

Probably the most significant characteristic of the invented junction is the variation of concentration gradient across the junction from the surface to the depth of 5 (five) microns or less from the surface into bulk. At the surface the concentration gradient across the junction is between $4 \times 10^{24}$ to $7 \times 10^{23}$ dopant atoms/cm.$^3$-cm. which gives a breakdown voltage of about 5 to 6 volts, while at 5 microns or less from the surface, the concentration gradient across the junction is in the range of about $2.5 \times 10^{23}$ to $2.0 \times 10^{23}$ dopant/atoms/cm.$^3$-cm., giving breakdown at about 8–9 volts. In a preferred embodiment of the invention, the 8–9 volt breakdown and its associated concentration gradient occurs 1 micron or less from the surface.

The required variation in concentration gradient across the junction is achieved by decreasing the dopant concentration with depth on one side or on both sides of the junction. The dopant concentration of at least the more lowly doped side of the junction has a maximum value near the surface so that the maximum value of dopant concentration gradient across the junction will lie within the region extending from the surface to 0.5 micron from the surface of the wafer. In a typical practical embodiment, the maximum doping level of one of the dopants and accordingly, the maximum dopant concentration gradient across the junction occurs within the region of 0.1–0.3 micron from the surface. Typically, the concentration of one of the dopants decreases from the point of highest concentration and in a direction away from the surface with a concentration gradient of at least $7 \times 10^{19}$ and possibly as high as $1.5 \times 10^{24}$ dopant atoms/cm.$^3$-cm. The large gradient adjacent to the surface is primarily obtained by shortening the diffusion time. The exact diffusion time is dependent on surface concentration, oxide thickness, temperature and the particular dopant employed.

It should be understood that it is only necessary for one of the conductivity type regions of the junction to have the described concentration gradient. In general, it is desirable that the other conductivity type have a concentration at least an order greater and preferably two orders or more greater than the lightly doped side of the junction. It is not necessary that this conductivity type sharply decrease. The presence of only one sharply decreasing conductivity type enables the point of avalanche breakdown to be precisely controlled with only one closely controlled diffusion step. It may in certain instances prove desirable to form both regions with sharply decreasing concentration gradients near the surface. Then, both regions tend to force the area of lowest breakdown voltage toward the surface.

A typical structure is shown in FIG. 4 where the depth of region 60 has a range of about 2–4 microns with a surface concentration in the range of about $10^{18}$ to $10^{19}$ dopant atoms/cm.$^3$. The region 64 has surface concentrations in the range of about $10^{20}$ to $10^{21}$ dopant atoms/cm.$^3$ and a depth in the range of about 0.7 to 1.5 microns.

The above specific details and definition of the junction structure should not cloud the more general concept behind the dopant concentrations, which is the attainment of avalanche breakdown as close as possible to the surface and preferably within 0.5 micron while avalanche breakdown at distances greater than 0.5 micron is minimized. This is achieved by a high concentration gradient across the junction at the surface, enabling a low breakdown voltage and a high concentration gradient of at least one of the regions parallel to the PN junction downward from the surface into the bulk.

The means for operating the PN junction in an avalanche mode is schematically shown as comprising an energy source 18 which may be voltage supply or current source, and is coupled across the PN junction 10 between conductive strip 22 and conductive layer 24, via switches 30 and 32, respectively. The conductive strip 22 may be formed by techniques such as described in detail in U.S. Patent 2,981,877, issued to Robert N. Noyce on Apr. 25, 1961. Briefly, this technique comprises forming an oxide insulating layer such as layer 26 over the surface 16 and then selectively removing a portion of the layer overlying the N-type region 14. A metal coating, such as aluminum, is then deposited over the entire surface of the wafer and insulating layer, and the unwanted portions then removed by photoengraving techniques to leave only the conductive strip 22. The oxide coating 26 insulates the conductive strip 22 from the semiconductor body surface 16 except where it contacts the N-type region 14.

It should be understood that the switches 30 and 32 are shown schematically as switch arms, but in practice, where a large number of PN junctions are assembled in an orderly arrangement, the switches would take the form of one of the well known transistor or silicon controlled rectifier switching circuits adapted to function as means for selectively connecting the energy source 18 to a PN junction. A plurality of PN junctions like the one shown in FIG. 1 may be fabricated and placed in side-by-side relationship. The selective closing of the switches attached to these individual units would result in one or more of these junctions being energized according to the switching program.

Figure 3:
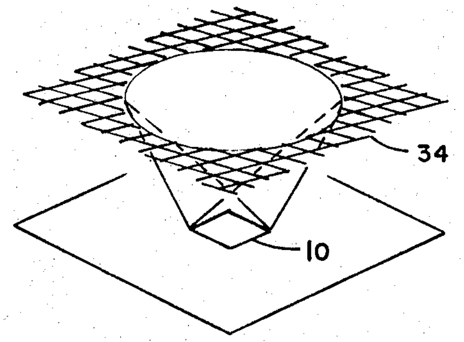
FIG. 3 is a schematic showing of how the square junction results in a circular dot.

In FIG. 3, the semiconductor body 8 and its PN junction 10 are shown adjacent to a recording medium 34, such as a photographic material. The geometry of the junction 10 takes the form of a square or rectangle in this embodiment. It may, of course, take any geometry that is thought to be desirable. When using a square geometry, it is still possible to obtain a circular or dot-like exposure on the photographic material 34. The formation of a dot is accomplished by spacing the photographic material at a proper distance from the line source of the junction so that the lambertian distribution of light from each point on the junction periphery combines at the emulsion plane to provide the desired circular or dot-like density profile. With a 2-mil square junction configuration, it has been found that the photographic material may be spaced from 2–10 mils from the surface of the body 8. A spacing of 5–6 mils is preferred. With this spacing and configuration, a dot having a density profile 8 mils in diameter at the 50% transmission point and a flat top of approximately 5 mils in diameter is formed on the photographic material 34. It should be appreciated that the total area occupied by the light source may be 4 square mils or less with the light emission taking place along the junction perimeter.

Before the operation of the device shown in FIGS. 1 and 3 is considered, a few of the more significant facts regarding the PN junctions and the avalanche mode of operation should be discussed. One important aspect of the invention is the realization of a solid state light source, such as a silicon light pulser, that is capable of producing minute spots of light. The generation of light in a solid state device is created when the PN junction is operated in the avalanche breakdown mode, which is a non-destructive condition. This mode of operation requires the junction doping profile gradient to be such that breakdown is caused primarily by avalanche multiplication as opposed to field emission, which dominates when the breakdown voltage of the junction falls below a given value. Field emission results in decreased efficiency of visible light generation. The particular value of optimum breakdown voltage will vary, depending upon the specific concentration gradient across the junction. In any event, a voltage above the field emission breakdown voltage is necessary for efficient operation. In the concentrations stated above, 5½ to 6 volts has been found optimum.

The fundamental mechanism considered responsible for the emission of light from the avalanching junction is the radiative energy transitions of "hot" charged carriers crossing the junction under the influence of intense electric field. These carriers have a broad distribution of energy and therefore the spectral distibution of photons emitted in radiative transistions is fairly wide. When radiation occurs deep in the bulk of the silicon, most of the short wavelength photons are absorbed by the silicon, and the emitted light peaks sharply in the red and infrared portion of the spectrum.

Figure 2:
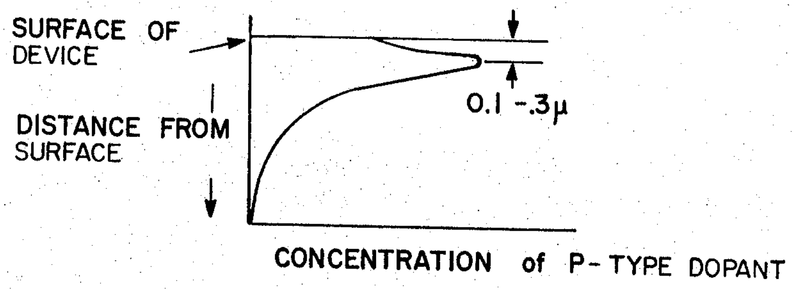
FIG. 2 is a graphical showing of the dopant concentration profile from the surface of a semiconductor wafer inwardly in the diffused region.

This invention takes advantage of the above facts by (1) operating the junction at an optimum voltage and (2) incorporating a junction structure which forces the avalanche breakdown to occur within a micron or less of the silicon wafer surface so that the short wavelengths are not absorbed. Thus an appreciable amount of light can be generated in the blue-green region of the spectrum with the emitted light appearing as warm white to the eye. The junction structure which enables avalanche breakdown to occur near the surface includes a dopant concentration that is highest near the surface. As shown in FIG. 2, the concentration of dopant of one of the regions has a concentration profile from the surface downward along the junction that takes the form of a narrow sharply peaked curve. It is important that the peak occur as close to the surface of the wafer as possible and that it have a relatively narrow width. With N-type dopants, it is possible that the peak occur immediately adjacent the surface. The greater the width of the peak, the deeper the avalanche breakdown will penetrate the wafer as current is increased; such deep penetration results in inefficient light generation.

When the emitted light is viewed under a microscope, it appears as a uniform line source having a width of about 3,000 A. occuring along the line where the PN junction intersects the surface of the device. The brightness of individual saturated microplasmas is estimated at approximately 5 lamberts at nominal current densities. This brightness would probably not be effective if one follows the prior art teachings and employs optical systems to focus the light. However, by disregarding these techniques and exposing a recording medium, such as a photographic film, by contact or near contact with the microplasma region, an effective recording technique is achieved.

In operation, the PN junction shown in FIGS. 1 and 3 is selectively energized by the closing of switches 30 and 32. This energization places a reverse voltage on the junction of sufficient magnitude to cause it to operate in the avalanche mode. During this mode of operation, light emitting microplasmas form along the PN junction 10. This PN junction is located on appropriate distance from the photographic material 34 (FIG. 3), resulting in the exposure of the photographic material to form a minute dot. The exposed dot is representative of recorded data.

The above description of a simplified embodiment of the invention has shown a PN junction having dimensions in the range of $10^{-3}$ inches or a few mils that is capable of functioning as a light source, and more particularly as a recording transducer which is capable of exposing a photographic material and forming a round exposed dot from a square junction. The efficiency of the light emission is enhanced by a unique doping arrangement wherein the highest concentration of the dopant is very near the surface of the wafer and has a concentration profile from the surface downward normal to the wafer from the edge of the junction that is in the form of a narrow peaked curve. Further, the recording on the photographic material is accomplished with the elimination of all optics.

A practical and more detailed embodiment of the invention incorporating other novel aspects of the invention is shown in FIGS. 4–6 which discloses an $x$–$y$ matrix of PN junctions. This matrix may be operated in accordance with a novel coincident energization technique. The integrated matrix may be fabricated by well known planar technology that enables a matrix of many units to be formed with a high degree of reliability by the use of batch wafer processing techniques resulting in mass production. The interconnection of the individual PN junctions that make up the matrix is accomplished by diffusion and vacuum deposition techniques which enable the entire matrix to be interconnected in a similar batch process with relatively few assembly operations.

The interconnection techniques employed in the embodiment of FIGS. 4–6 is broadly taught in U.S. patent application Ser. No. 103,564, entitled "Solid State Circuit With Crossing Leads and Method for Making Same," filed Apr. 17, 1961, now Patent No. 3,199,002, issued August 3, 1965 and assigned to the same assignee as this invention. A low total interconnection resistance along the rows and columns of a plurality of $x$–$y$ interconnected PN junctions is attained in spite of the many cross-overs. The capability to form such a low interconnection resistance is especially important in the $x$–$y$ accessing of a PN junction.

If the PN junction and the interconnections have a high total resistance, then a higher power energy source would be required in order that an adequate energy be applied to the last PN junction in the series. Such augmented power at the source is not good, since it would tend to break down the first PN junction in the series; therefore, to avoid the requirement for increased power, the number of PN junctions connected in series must be limited. The high conductivity cross-over connection of this invention decreases interconnection resistance, decreases power consumption and thus enables more PN junctions to be connected in series.

With the above aspects of the invention in mind, a detailed structural consideration of one embodiment of the invention is now in order. The *x–y* matrix of FIGS. 4–6 comprises a semiconductor body 50 that takes the form of monocrystalline wafer on N-type silicon containing such dopant as phosphorus, antimony, or arsenic. The doping of the wafer 50 may be accomplished by doping during crystal growth or subsequent thereto by well known techniques, such as diffusion. The wafer 50 has a plurality of cells such as 52, 54, 56, and 58. These cells are substantially identical in construction and are arranged in an *x–y* matrix. Only four of these cells shown in FIG. 4, but in practice, as many as 576 or more of these cells are often incorporated in a single integrated circuit wafer. The illustrated cells 52 and 54 are spaced on 18 mil centers, while the cells 52 and 58 are spaced on 18 mil centers. Cells 52 and 58 may be considered to lie in a single column, while the cells 54 and 56 lie in a different column. The cells 52 and 54 lie in a single row, while the cells 56 and 58 lie in different row. This terminology, of course, can be reversed and is only used for purposes of definition and facilitating this detailed description.

Referring to the sectional views of FIGS. 5 and 6, each of the cells is substantially identical so that the decription of one cell will suffice as a description of all the cells in the matrix. Cell 52 comprises a region 60 of a first conductivity type, e.g., P-type, such as may be formed by diffusion of aluminum, indium, or preferably boron, which is opposite to the N-type conductivity type of wafer 50. All the P-type regions in the matrix, such as region 60, may be simultaneously formed by well known photoengraving and diffusion techniques, such as described in U.S. Patent 3,108,359, issued on Oct. 29, 1963, to Gordon E. Moore and Robert N. Noyce, and assigned to the same assignee as this invention. Briefly, in the case of a silicon wafer, an oxide mask is formed on the surface 62 by oxidizing the wafer 60 and then by photoengraving techniques selectively removing portions of the oxide where the P-type regions 60 are to be formed. The wafer 50 is then placed into a diffusion furnace and the appropriate dopant introduced to form a multiplicity of P-type regions, such as region 60.

Within each region 60 is formed a pan-shaped region 64 having a conductivity type opposite to that of the region 60, e.g., N-type, employing antimony, arsenic, or preferably phosphorus as a dopant. These regions may also be formed simultaneously by photoengraving and diffusion, as described with regard to region 60. The P-type region 60 and the N-type region 64 may include dopant concentrations as explained with regard to FIGS. 1–3 to form a PN junction adapted to emit light when operated in the avalanche mode.

At the same time as the N-type regions 64 are formed, a pair of highly conductive semiconductor material portions 68 and 70 are formed within the active P-type region 60 of the cell 52. The highly conductive portions 68 and 70 take the form of rectangular-shaped regions that extend across a substantial portion of the cell 52. These conductive portions 68 and 70 are heavily-doped in order to provide a high conductivity. The designation N+ in FIGS. 4 and 5 denotes this high conductivity. It should be noted that region 64 and portions 68 and 70 all have substantially the same dopant concentrations, so that they can be formed simultaneously in all of the cells in the matrix.

With the semiconductor portion of the matrix formed, it is only necessary to deposit the conductive strips to complete the matrix. Referring to FIGS. 4 and 6, the continuous conductive strips 72 connect cells, such as cells 52 and 58 in a column. More particularly, the N-type regions 64 in each cell have the oxide removed from their surface (as by photoengraving) so that the continuous conductive strips 72 may electrically contact each of the exposed surfaces of the regions 64 and connect a plurality of the regions 64 in sequence. In the embodiment shown, the strips 72 are narrow when in the proximity of the light emitting junctions formed between regions 60 and 64 and wider when outside the cells. This minimizes the conductor strip's interference with the light emission while maintaining a low resistance for the strips.

The continuous conductive strips 72 are formed by first removing a part of the oxide 74 from the surface 62 where it overlies the region 64. This selective removal may be accomplished by well known photoengraving techniques. Following the removal of the portions of oxide 74, the continuous conductive strips 72 may be formed by vacuum evaporation techniques. This may be accomplished by at least two well known methods. Briefly, the entire surface of the matrix may be first covered with the conductive metal that is to form the strips and then the unwanted portions are selectively removed by photoengraving techniques. Alternately, the conductive strips may be directly formed by vacuum evaporation through a precision mask having apertures located where it is desired that the conductive strips be formed. The mask is positioned adjacent the wafer and the conductive material evaporated and deposited on the wafer via the mask. At the completion of the vacuum evaporation of the strips 72, the N-type regions 64 will be electrically connected in sequence.

Still referring to FIGS. 4 and 6, simultaneous with the formation of the continuous conductive strips 72, a series of short conductive strips 76, 78, and 80 may be formed. These short conductive strips contact the conductive semiconductor portions 68 and 70 at their ends to connect a plurality of P-type regions 60 in series via a low resistance connection. The conductive strips 76, 78, and 80, along with the conductive portions 68 and 70, form a continuous conductor which crosses under the continuous conductive strips 72 and is insulated therefrom by the oxide layer 74. The oxide layer 74 may be formed before, during, or after the diffusion of the regions 60 and 64 and the diffused portions 68 and 70, and may be the same oxide that is used as a mask during the diffusion of these regions. Some parts of the layer 74 are in reality composite layers formed from the successive growth of a number of oxide layers. The cross-sectional shape of the oxide layer 74 is simplified for the purposes of this description. The short conductive strips 76-80 are insulated from the semiconductor material by the oxide layer 74 except where they contact regions 60 and conductive portions 68 and 70. The continuous conductive strips 72 are similarly insulated by the oxide layer 74 except where they contact regions 64.

Like the continuous conductive strips 72, the short conductive strips 76, 78, and 80 may be formed by vacuum evaporation and photoengraving techniques. More particularly, the oxide 74 overlying the ends of the portions 68 and 70 and a portion of region 60 is selectively removed simultaneously with the removal of the oxide over the region 64. Following the oxide removal, the conductive strips 76-80 are formed by vacuum evaporation techniques simultaneously with the formation of the continuous conductive strips 72 and by the same technique. Thus, all of the oxide removal steps necessary to the interconnection of the cells are performed simultaneously and then the formation of all the conductive strips for the matrix are simultaneously fabricated, thereby facilitating the formation of the entire interconnected matrices in a single operation.

It should be understood that it is consistent with this invention to form the semiconductor conductive portion 68 and 70 with a P+ conductivity type. This would require that the processing steps be revised slightly. In such an embodiment, the P+ portions 68 and 70 would be completed after the formation of the P-type regions 60 by selectively removing the oxide only over the portions 68 and 70 that are to be formed and then diffusing additional dopant. The semiconductor portion of the structure is then completed by forming N-type region 64 as described above.

In operation one terminal of, an energy supply, such as a current or voltage source, is coupled through a logical switching network (not shown) to a plurality of contacts, such as 88, that are attached to the continuous conductive strips 72 which connects the regions 64 in columns. The other terminal of the same source is also coupled to a plurality of contacts, such as 90, connected to the short conductive strips 76 which are in turn connected to the conductive portions 68 and 70. The logical switching networks enable one continuous conductive strip and one series of short conductive strips and conductive portions to be energized simultaneously. Only the single cell at the intersection of the row and column of energized conductive paths is energized. In the silicon light pulse embodiment, the selectively energized cell would emit light and be positioned adjacent the photographic material to form an exposed dot. Thus an *x–y* matrix of PN junctions has been described wherein any one or more of the PN junctions may be selectively energized. The matrix may be mass produced consistent with the planar technology that is known for its high yield and reliable devices.

There are, of course, many other geometries and modes of operation that are within the purview of the invention that could be constructed by one of ordinary skill in the art. It is within the broad scope of the invention to use doping concentrations that would result in a different color of light being emitted from the light cells. It is also possible to employ P-type impurities where N-type has been shown and vice versa.

In summary, a solid state device has been invented having the following advantages and invention aspects, to mention a few (1) a minute light source is provided having dimensions of only a few mils; (2) an efficient solid state light source made from silicon; (3) a recording transducer wherein no optic system is necessary to obtain spot position accuracy and desired dot density; (4) an *x–y* matrix of PN junctions wherein any one or more of the PN junctions may be accessed; (5) an interconnecting scheme for efficiently connecting a rectangular matrix of PN junctions; and (6) a solid state matrix compatible with batch processing techniques and the planar technology.

It will be appreciated by those skilled in the art that the invention may be carried out in various ways and take various forms and embodiments other than those illustrated embodiments heretofore described. It is understood that the scope of the invention is not limited by details of the foregoing description or by the advantages stated therein, but will be defined in the following claims.

What is claimed is:

1. In a semiconductor light source, the combination comprising a silicon body of a first conductivity type having a surface, a first region of opposite conductivity type to said body formed within said body and extending to said surface, and a second region of the same conductivity type as said body formed within said first region and extending to said surface, said first region having a dopant concentration highest near said surface, whereby a maximum amount of light is emitted when said device is operated in an avalanche mode.

2. In a semiconductor light source, the combination comprising a silicon body of a first conductivity type having a surface, a first region of opposite conductivity type to said body formed within said silicon body and extending to said surface, and a second region of the same conductivity type as said body formed within said first region and extending to said surface, said first conductivity type region having a dopant concentration highest at a distance of under one micron from said surface, whereby a maximum amount of light is emitted when said device is operated in an avalanche mode.

3. The structure recited in claim 2 wherein said dopant concentration has a profile extending downward from the surface in the form of a sharp peaked curve peaking at under one micron from said surface.

4. A semiconductor device comprising a monocrystalline semiconductor region of a first conductivity type having a substantially planar surface, a region of opposite conductivity type located within said body adjacent said surface to form a PN junction extending to the surface of said body, one of said conductivity types having a concentration of dopant that enables avalanche breakdown to take place within 0.5 micron from said surface while avalanche breakdown at distances greater than 0.5 micron is minimized.

5. A semiconductor device comprising a first monocrystalline semiconductor region having a surface and a first conductivity type dopant distributed therein, a second monocrystalline semiconductor region of opposite conductivity type dopant located adjacent said first conductivity type dopant to form a PN junction extending to the surface of said first region, said dopants in said regions distributed to have a concentration gradient across said junction of at least about $7.0\times10^{23}$ dopant atms./cm.$^3$-cm. at said surface, and a concentration gradient across said junction of at least about $2.0\times10^{23}$ dopant atoms/cm.$^3$-cm. at less than about 5 microns from said surface.

6. The structure defined in claim 5 wherein the concentration gradient across the junction at the surface is in the range of $7.0\times10^{23}$ to $4.0\times10^{24}$ dopant atoms/cm.$^3$-cm. and the concentration gradient across said junction at less than about 5 microns from said surface is in the range of about $2.0\times10^{23}$ to $2.5\times10^{23}$ dopant atoms/cm.$^3$-cm.

7. A semiconductor device comprising a first monocrystalline semiconductor region having a substantially planar surface and a first conductivity type dopant distributed therein, a second monocrystalline semiconductor region of opposite conductivity type dopant located within said first conductivity type region form a PN junction extending to said surface of said first region said dopant concentration gradient across said junction at said surface yielding a breakdown voltage of less than about 6 volts, and said dopant concentration gradient across said junction at less than about 5 microns from said surface yielding a breakdown voltage of greater than about 7 volts.

8. An integrated circuit comprising a monocrystalline semiconductor body containing a plurality of PN junctions arranged in an *x–y* matrix, said PN junctions each including a P-type region and an N-type region and arranged in rows and columns; connecting means for connecting the regions of one conductivity type in rows and the regions of the other conductivity type in columns, said connecting means comprising a continuous conductive strips connecting one plurality of regions, and a series of conductive semiconductor portions in said body and conductive strips connected thereto connecting the other plurality of regions, said short conductive strips contacting said conductive semiconductor portions to form a continuous conductor; an insulating layer separating said short and continuous conductive strips from said semiconductor body except where said strips contact said conductive semiconductor portions; and energizing means coupled to said rows and columns for energizing a selected row and column.

9. The structure defined in claim 8 wherein said conductive semiconductor portion has a conductivity type opposite to one of said plurality of regions and is located in one of said regions and beneath said continuous conductive strips and separated therefrom by an insulating layer.

10. The structure defined in claim 8 wherein at least one of the conductivity type regions has a high concentration of dopant near the surface of said body of semiconductor material and said energizing means applies a voltage that is adapted to operate said PN junctions in an avalanche mode.

11. The structure defined in claim 8 wherein said integrated circuit is located adjacent a recording medium without intermediate optics.

12. The structure defined in claim 11 wherein said recording material medium and said integrated circuit is separated by a distance of about 2–10 mils.

13. The circuit of claim 8 wherein one of said junction forming regions is located within the other junction forming region and wherein said other junction forming region is of a conductivity type opposite to that of said body.

14. An integrated circuit comprising a body of semiconductor material having a plurality of electrically isolated PN junctions formed therein arranged in an *x–y* matrix having rows and columns, each of said PN junctions being bounded by a first conductivity type region extending to a single substantially planar surface of said body, and a second opposite conductivity type region located within first region adjacent said surface; a first series of conductors for connecting said first conductivity type regions in rows and a second series of conductors for connecting said opposite conductivity type regions in columns, said conductors being electrically insulated from each other and from said surface except where said conductors contact the respective desired regions, whereby a single junction may be selectively energized by simultaneously energizing selected row and column conductors.

15. The circuit of claim 14 wherein said semiconductor body is a monocrystalline body of said opposite conductivity type.

16. The device of claim 14 including an energizing means for energizing a selected row and column to create an avalanche mode of operation in said selected PN junction whereby the selected PN junction emits light.

17. The semiconductor device of claim 16 wherein one of said regions bounding said junction has a dopant concentration that is greatest in the proximity of said surface, whereby avalanche breakdown occurs near said surface and a minimum of short wavelength light is obsorbed by said region.

References Cited

UNITED STATES PATENTS

| | | | |
|---|---|---|---|
| 2,735,049 | 2/1956 | De Forest | 313—108 X |
| 3,173,745 | 3/1965 | Stone et al | 346—107 |
| 3,254,267 | 5/1966 | Sack | 313—108 X |

FOREIGN PATENTS

| | | |
|---|---|---|
| 689,718 | 6/1964 | Canada. |

RICHARD B. WILKINSON, *Primary Examiner.*

J. W. HARTARY, *Assistant Examiner.*